United States Patent
Park et al.

(10) Patent No.: US 11,671,218 B2
(45) Date of Patent: Jun. 6, 2023

(54) METHOD FOR CONFIGURING FREQUENCY RESOURCE ABOUT COMPONENT CARRIER FOR NEW RADIO AND APPARATUSES THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 132 days.

(21) Appl. No.: 17/182,159

(22) Filed: Feb. 22, 2021

(65) Prior Publication Data

US 2021/0184807 A1 Jun. 17, 2021

Related U.S. Application Data

(63) Continuation of application No. 15/985,862, filed on May 22, 2018, now Pat. No. 10,979,190.

(30) Foreign Application Priority Data

| May 26, 2017 | (KR) | ........................ | 10-2017-0065379 |
| Jun. 27, 2017 | (KR) | ........................ | 10-2017-0081411 |
| Apr. 2, 2018 | (KR) | ........................ | 10-2018-0037938 |

(51) Int. Cl.
*H04L 5/00* (2006.01)
*H04W 72/04* (2023.01)
(Continued)

(52) U.S. Cl.
CPC .............. *H04L 5/005* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| 2010/0157913 A1 | 6/2010 | Nagata et al. |
| 2012/0140717 A1 | 6/2012 | Zhu et al. |

(Continued)

FOREIGN PATENT DOCUMENTS

| CN | 101645868 A | 2/2010 |
| CN | 101657018 A | 2/2010 |

(Continued)

OTHER PUBLICATIONS

Zhang, U.S. Appl. No. 62/507,679, filed May 17, 2017 (Year: 2017).*

(Continued)

*Primary Examiner* — Jay L Vogel
(74) *Attorney, Agent, or Firm* — Kile Park Reed & Houtteman PLLC

(57) ABSTRACT

Provided are a method of configuring resource block (RB) indexing information about a component carrier (CC) by a base station (BS). The method may include: configuring common RB indexing information about the CC; configuring one or more bandwidth parts (BWPs) based on the common RB indexing information; and transmitting the common RB indexing information and configuration information about the bandwidth parts to a terminal.

17 Claims, 11 Drawing Sheets

(51) Int. Cl.
*H04W 4/70* (2018.01)
*H04W 72/0453* (2023.01)

(52) U.S. Cl.
CPC .......... *H04L 5/0092* (2013.01); *H04L 5/0048* (2013.01); *H04W 4/70* (2018.02); *H04W 72/042* (2013.01); *H04W 72/0453* (2013.01)

(56) References Cited

U.S. PATENT DOCUMENTS

| | | |
|---|---|---|
| 2013/0242880 A1 | 9/2013 | Miao et al. |
| 2015/0085772 A1 | 3/2015 | Seo et al. |
| 2015/0085773 A1 | 3/2015 | Seo et al. |
| 2015/0304091 A1 | 10/2015 | Gou et al. |
| 2017/0019915 A1 | 1/2017 | Nogami et al. |
| 2017/0041909 A1 | 2/2017 | Seo et al. |
| 2017/0048829 A1 | 2/2017 | Kim et al. |
| 2018/0049170 A1 | 2/2018 | Seo et al. |
| 2018/0124687 A1 | 5/2018 | Park et al. |
| 2018/0131493 A1 | 5/2018 | Luo et al. |
| 2018/0183551 A1* | 6/2018 | Chou .................. H04W 74/006 |
| 2018/0288746 A1* | 10/2018 | Zhang .................. H04L 5/0048 |
| 2019/0109695 A1 | 4/2019 | Kim et al. |
| 2019/0140799 A1* | 5/2019 | Gao ...................... H04L 5/0051 |
| 2019/0149286 A1* | 5/2019 | Zhang .................. H04L 5/0092 |
| | | 370/329 |
| 2020/0274750 A1* | 8/2020 | Yi ...................... H04L 27/2659 |

FOREIGN PATENT DOCUMENTS

| | | |
|---|---|---|
| CN | 101801093 A | 8/2010 |
| CN | 101938793 A | 1/2011 |
| CN | 102131292 A | 7/2011 |
| CN | 102215571 A | 10/2011 |
| CN | 103108395 A | 5/2013 |
| CN | 103796314 A | 5/2014 |
| CN | 104380633 A | 2/2015 |
| CN | 104126328 B | 10/2018 |
| KR | 10-2016-0037757 A | 4/2016 |
| KR | 10-2016-0142348 A | 12/2016 |
| WO | 2014/130154 A1 | 8/2014 |

OTHER PUBLICATIONS

Huawei et al., "Discussion on resource block for NR", R1-1609429, 3GPP TSG RAN WG1 Meeting #86bis, Lisbon, Portugal, Oct. 10-14, 2016.
State Intellectual Property Office of People's Republic of Ch!na, Office Action of corresponding CN Patent Application No. 201810493891.7, dated Sep. 24, 2020.
U.S. Appl. No. 62/355,347, Kim, filed Jun. 28, 2016 (Year 2016).
Huawei et al., "On bandwidth part and bandwidth adaptation", R1 1706900, 3GPP TSG RAN WG1 Meeting #89, Hangzhou, China, May 15-19, 2017.
U.S. Appl. No. 62/420,462, filed Nov. 10, 2016 (Year 2016).
U.S. Appl. No. 62/439,434, filed Dec. 27, 2016 (Year 2016).

* cited by examiner

METHOD FOR CONFIGURING FREQUENCY RESOURCE ABOUT COMPONENT CARRIER FOR NEW RADIO AND APPARATUSES THEREOF

CROSS-REFERENCE TO RELATED APPLICATIONS

This application is a continuation of U.S. application Ser. No. 15/985,862, filed on May 22, 2018, which claims priority from Korean Patent Applications No. 10-2017-0065379, filed on May 26, 2017, No. 10-2017-0081411, filed on Jun. 27, 2017, & No. 10-2018-0037938, filed on Apr. 2, 2018, which are hereby incorporated by reference for all purposes as if fully set forth herein.

BACKGROUND OF THE INVENTION

Field of the Invention

The present disclosure relates to a method of configuring a bandwidth part for supporting a wider bandwidth operation in a next-generation/5G radio access network (hereinafter, referred to as a new radio (NR)) and a method of indexing a resource block (RB).

2. Description of the Prior Art

Recently, the $3^{rd}$ generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, and multiple access methods for a new radio (N). NR is required to be designed not only to provide an improved data transmission rate as compared with that of long term evolution (LTE)/LTE-Advanced, but also to satisfy various requirements in detailed and specific usage scenarios.

An enhanced mobile broadband (eMBB), massive machine-type communication (mMTC), and ultra reliable and low latency communication (URLLC) are proposed as typical usage scenarios for the NR. In order to meet the requirements of the individual scenarios, it is required to design flexible frame structures when compared to those of LTE/LTE-Advanced.

Particularly, in order to support terminals having different bandwidth capabilities in one or more NR component carriers (CCs), a bandwidth operation needs to be flexibly supported by configuring one or more bandwidth parts and setting and activating the bandwidth parts differently according to the terminals. Further, to this end, there is a need to develop a method of setting and indexing frequency resources of the NR CCs.

SUMMARY OF THE INVENTION

Aspects of the present disclosure are directed to providing a method of configuring bandwidth parts for setting frequency resources of new radio component carriers (NR CCs) and a method of indexing a resource block (RB).

According to an aspect of the present disclosure, there is provided a method of configuring, by a base station (BS), RB indexing information about a CC, the method including: configuring common RB indexing information about the CC; configuring one or more bandwidth parts (BWPs) based on the common RB indexing information; and transmitting the common RB indexing information and configuration information about the bandwidth parts to a terminal.

According to another aspect of the present disclosure, there is provided a method of receiving, by a terminal, a radio channel or a radio signal based on RB indexing with regard to a CC, the method including: receiving common RB indexing information about the CC and configuration information about bandwidth parts from a BS; and receiving a radio channel or a radio signal from the BS based on the common RB indexing information and the configuration information about the bandwidth parts.

According to still another aspect of the present disclosure, there is provided a base station (BS), which configures RB indexing information with regard to a CC, the BS including: a controller which configures common RB indexing information about the CC and configures one or more BWPs based on the common RB indexing information; and a transmitter configured to transmit the common RB indexing information and configuration information about the bandwidth parts to a terminal.

According to yet another aspect of the present disclosure, there is provided a terminal which receives a radio channel or a radio signal based on RB indexing with regard to a CC, the terminal including a receiver configured to receive common RB indexing information about the CC and configuration information about bandwidth parts from a base station (BS), and receive a radio channel or a radio signal from the BS based on the common RB indexing information and the configuration information about the bandwidth pans.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
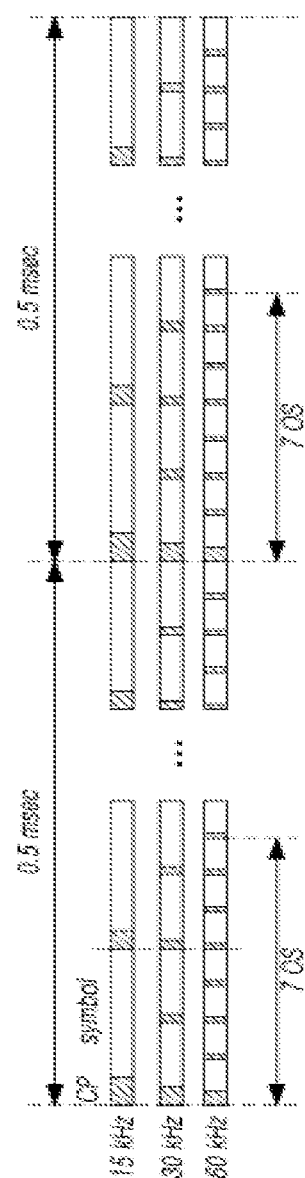
FIG. 1 illustrates arrangements of orthogonal frequency division multiple (OFDM) symbols when subcarrier spacings, which are different from each other, are used according to embodiments.

Hereinafter, embodiments of the present disclosure will be described in detail with reference to the accompanying drawings. In adding reference numerals to elements in each drawing, the same elements may be designated by the same reference numerals although the same elements are shown in different drawings. Further, in the following description of the present disclosure, detailed descriptions of functions and configurations related to the known structure may be omitted when it is determined that the descriptions may obscure the gist of the present disclosure.

In the present disclosure, a wireless communication system refers to a system for providing various communication services such as a voice service, a packet data service, etc. The wireless communication system may include a user equipment (UE) and a base station (BS).

The UE may be a comprehensive concept that indicates a terminal for use in wireless communication, including a UE, used for wideband code division multiple access (WCDMA), long term evolution (LYE), high speed packet access (HSPA), international mobile telecommunications (IMT)-2020 (5G or new radio), or the like, and a mobile station (MS), a user terminal (UT), a subscriber station (SS), a wireless device, or the like used for a global system for mobile communications (GSM).

The BS Or a cell generally refers to a station where communication with a UE is performed. The BS or the cell inclusively means all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), radio unit (RU), and a small cell.

Each of the above-described various cells has a BS that controls a corresponding cell, and thus, the BS may be construed in two ways. 1) The BS may be a device that provides the megacell, the macrocell, the microcell, the picocell, the femtocell, and the small cell in association with a wireless area, or 2) the BS may indicate the wireless area itself. In item 1), the BS may be any device that interacts with another device to enable the device that provides a predetermined wireless area to be controlled by an identical entity or to cooperatively configure the wireless area. Based on a configuration type of the wireless area, the BS may be a point, a transmission/reception point, a transmission point, a reception point, or the like. In item 2), the BS may be the wireless area itself that receives or transmits a signal from a perspective of the terminal or a neighboring BS.

In the present disclosure, the cell may refer to the coverage of a signal transmitted front the transmission/reception point, a component carder having the coverage of the signal transmitted from the transmission/reception point (transmission point or transmission/reception point), or the transmission/reception point itself.

In the present disclosure, the user equipment and the BS are used as Iwo (uplink and downlink) inclusive transceiving subjects to embody the technology and technical concepts described in the specifications, however, may not be limited to a specific term or word.

Here, a term uplink (UL) refers to a scheme far the UE to transceive data to the BS, and a term downlink (DL) refers to a scheme for the BS to transceive data to the UE.

UL transmission and DL transmission may be performed using a dine division duplex (TDD) scheme that performs transmission based on different times, ii) a frequency division duplex (FDD) scheme that performs transmission based on different frequencies, or iii) a mixed scheme of the TDD and FDD schemes.

Further, in the wireless communication system, a standard may be developed by forming a UL and a DL based on a single carrier or a pair of carriers.

The UL and the DL may transmit control information through a control channel, such as a physical DL control channel (PDCCH), physical UL control channel (PUCCH), and the like. The UL and the DL may be configured as a data channel, such as a physical DL shared channel (PDSCH), physical UL shared channel (PUSCH), and the like, to transmit data.

The DL may refer to communication or a communication path from a multi-transmission/reception point to the terminal, and the UL may refer to communication or the communication path from the terminal to a multi-transmission/reception point. In the DL, a transmitter may be a part of multiple transmission/reception points, and a receiver may be a part of the terminal. In the UL, a transmitter may be a part of the terminal, and a receiver may be apart of multiple transmission/reception points.

Hereinafter, a situation in which signals are transmitted and received through a channel such as the PUCCH, the PUSCH, the PDCCH, or the PDSCH will be expressed as the transmission and reception of the PUCCH, the PUSCH, the PDCCH, or the PDSCH.

Meanwhile, higher layer signaling includes a radio resource control (RRC) signaling that transmits RRC information including an RRC parameter.

The BS performs DL transmission to the terminals. The BS may transmit a physical DL control channel for transmitting DL control information such as scheduling required to receive a DL data channel, which is a main physical channel for unicast transmission, and scheduling approval information for transmission on a UL data channel. Hereinafter, transmission and reception of a signal through each channel will be described as transmission and reception of a corresponding channel.

Varied multiple access schemes may be unrestrictedly applied to the wireless communication system. Various multiple access schemes, such as time division multiple access (TDMA), frequency division multiple access (FDMA). CDMA, orthogonal frequency division multiple access (OFDMA), non-orthogonal multiple access (NOMA), OFDM-TDMA, OFDM-FDMA, OFDM-CDMA, and the like may be used. Here, NOMA includes sparse code multiple access (SCMA), low cost spreading (LDS), and the like.

Embodiments of the present disclosure may be applicable to resource allocation in an asynchronous wireless communication scheme that evolves into LTE/LTE-advanced and IMT-2020 through GSM, WCDMA, and HSPA, and may be applicable to resource allocation in a synchronous wireless communication scheme that evolves into CDMA, CDMA-2000, and UMB.

In the present disclosure, an machine type communication (MTC) terminal refers to a terminal that is low cost (or low complexity), a terminal that supports coverage enhancement, or the like. Alternatively, in the present disclosure, the MTC terminal refers to a terminal that is defined in a predetermined category for maintaining low costs (or low complexity) and/or coverage enhancement.

In other words, in the present specifications, the MK terminal may refer to a newly defined 3GPP Release-13 low cost (or low complexity) UE category/type which executes LTE-based MX related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release-13 low cost (or low complexity) UE category/type. Alternatively, the MTC terminal may refer to a further Enhanced MTC terminal defined in Release-14.

In the present disclosure, a narrowband Internet of Things (NB-IoT) terminal refers to a terminal supporting radio access for cellular IoT. NB-IoT technology is aimed at indoor coverage improvement, support for large-scale low-speed terminals, low latency sensitivity, very low terminal costs, low power consumption, and optimized network architecture.

An eMBB, mMTC, and URLLC are proposed as typical usage scenarios for NR which have been under discussion in the 3GPP in recent years.

In the present disclosure, a frequency, a frame, a subframe, a resource, a resource block, a region, a band, a sub-hand, a control channel, a data channel, a synchronization signal, various reference signals, various signals, and various messages associated with NR may be interpreted as meanings used in the past or present or as various meanings to be used in the future.

NR

Recently, the 3GPP has approved the "Study on New Radio Access Technology", which is a study item for research on next-generation/5G radio access technology. On the basis of the study item, the 3GPP have started to have discussions about frame structure, channel coding & modulation, waveform, multiple access scheme, etc.

NR is required to be designed not only to provide a data transmission rate improved as compared with that of LTE/LTE-Advanced, but also to satisfy various requirements in detailed and specific usage scenarios. In particular, an eMBB, mMTC, and (AUX have been given as representative usage scenarios of the NR, and it has been required to design flexible frame structures as compared with those for IIIEETE-Advanced in order to satisfy the requirements of each individual scenario.

Specifically, the eMBB, mMTC and URLLC have been taken into account for the representative usage scenarios of the NR being discussed in the 3GPP. Since the usage scenarios are different from one another in terms of requirements for data rates, latency, coverage, etc., necessity for a method of efficiently multiplexing radio resource units based on different kinds of numerology (e.g., a subcarrier spacing (SCS), a subframe, a transmission time interval (IT), etc.) has been proposed as a method of efficiently satisfying requirements according to usage scenarios through a frequency band of a certain NR system.

To this end, there have been discussions about a method of multiplexing and supporting numerology having different values of SCS based on TDM, FDM or TDM/FDM through one NR carder, and a method of supporting one or more time units in forming scheduling units in a time domain. In this regard, the NR has defined a subframe as one kind of time domain structure, and a single subframe duration configured with 14 OFDM symbols of 15 kHz SCS-based normal CP overhead like the LTE as reference numerology to define the corresponding subframe duration. Therefore, the subframe in the NR has a time duration of 1 ms. However, unlike the LTE, the subframe of the NR may have a slot and a mini-slot, defined as an actual UL/DL data scheduling-based time unit, which is an absolute reference time duration. In this case, the number of OFDM symbols far forming the corresponding slot, i.e., a value of y, has been defined as y=14 regardless of the numerology.

Therefore, a certain slot may include 14 symbols. In accordance with transmission directions for the corresponding slot, any of the symbols may be used for DL transmission or UL transmission, or the symbols may be used in the form of a DL portion+a gap+a UL portion.

Further, a mini-slot configured with fewer symbols than those of the corresponding slot may be defined in certain numerology (or SCS), and a short time domain scheduling interval for transmitting and receiving UL/DL data may be set based on the mini-slot. Also, a long time domain scheduling interval for transmitting and receiving UL/DL data may be configured by slot aggregation.

Particularly, in the case of transmitting and receiving latency critical data like the URLLC, when the scheduling is performed in units of slots based on 0.5 ms (7 symbols) or 1 ms (14 symbols) defined in a frame structure based on the numerology having a small SCS value like 15 kHz, latency requirements may be difficult to satisfy with the scheduling. To this end, the mini-slot having fewer OFDM symbols than those of the corresponding slot is defined, and thus the scheduling for the latency critical data like the URLLC is performed based on the mini-slot.

Further, as described above, there has been discussions about a method of scheduling data in accordance with latency requirements based on the length of the slat (or mini-slot) defined in each individual numerology by using the TDM or FDM method to multiplex and support the numerology having different SCS values within one NR carrier. For example, as shown in FIG. 1, the length of a symbol for 60 kHz SCS is shortened by a fourth of that for 15 kHz SCS, and thus a 60 kHz-based slot is shortened to have a length of about 0.125 ms as compared with a 15 kHz-based slot having a length of 0.5 ins under the same condition that one slot is configured with seven OFDM symbols.

As described above, a method of satisfying each requirement of URLLC and eMBB has been under discussion by defining different SCS or different TTI length in the Wider Bandwidth Operations The typical LTE system supports a scalable bandwidth operation with regard to a. LTE component carrier (CC). That is, in accordance with frequency deployment scenarios, a LTE business operator configures a bandwidth within a range of the minimum of 1.4 MHz to the maximum of 20 MHz in terms of configuring one LTE CC, and therefore a normal LTE terminal supports a transceiving bandwidth capability of 20 MHz with respect to one LTE CC.

Figure 2:
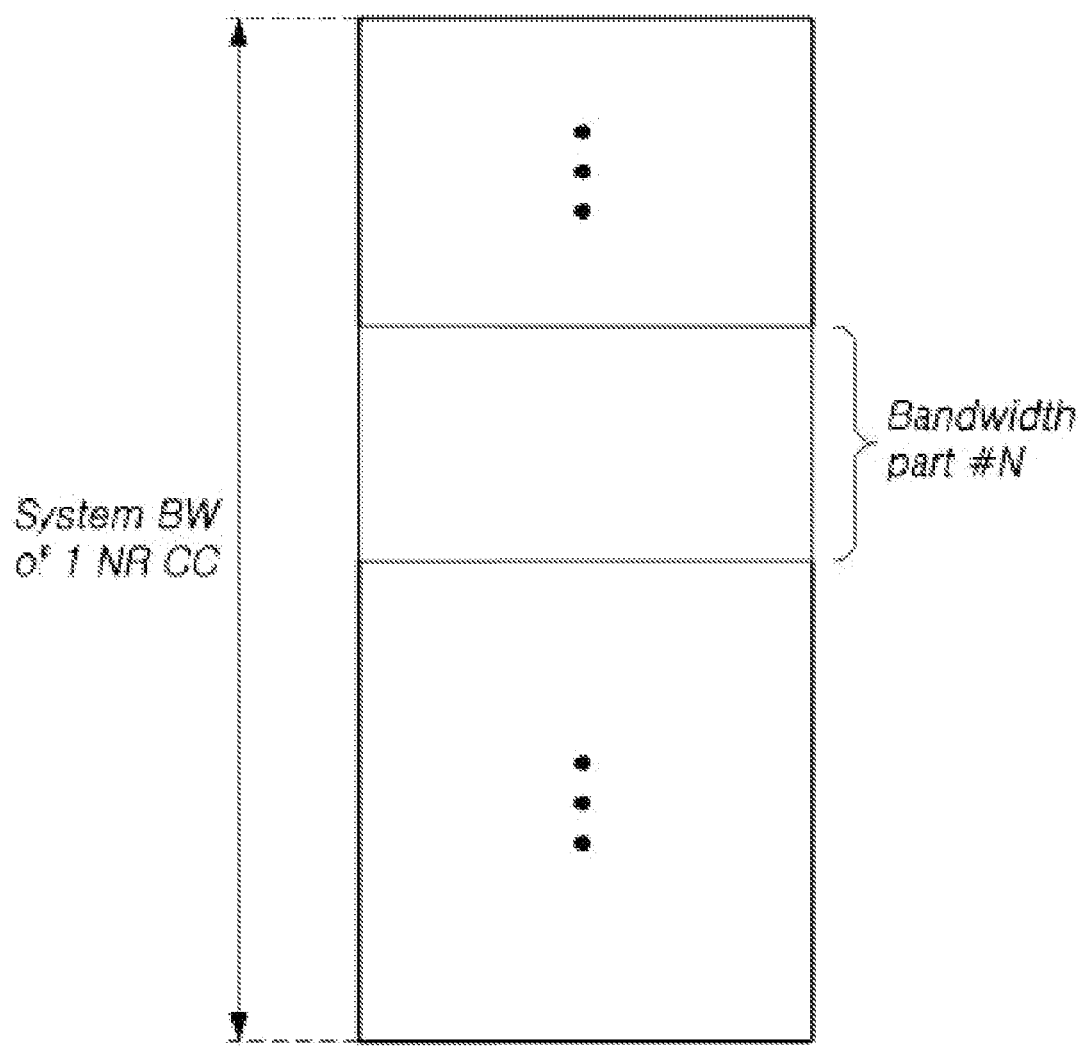
FIG. 2 illustrates a conceptual example of a bandwidth part according to an embodiment.

On the other hand, the NR has been designed to support NR terminals having different transceiving bandwidth capabilities with respect to one NR CC, and thus the NR is required to configure one or more bandwidth parts divided into many bandwidths with respect to a certain NR CC and set and activate the bandwidth parts differently according to the terminals to thereby support a flexible wider bandwidth operation as shown in FIG. 2.

Like this, it may be defined that a NR CC is divided into one or more bandwidth parts, the one or more bandwidth parts are configured for each individual terminal, and a UL/DL radio signal and channel for a terminal is transceived by activating at least one bandwidth part among one or more bandwidth parts configured for the corresponding terminal.

Further, when a plurality of numerologies (e.g., SCS, CP length, etc.) are supported in a NR CC, transceiving numerologies may be set differently according to the bandwidth parts.

Figure 3:
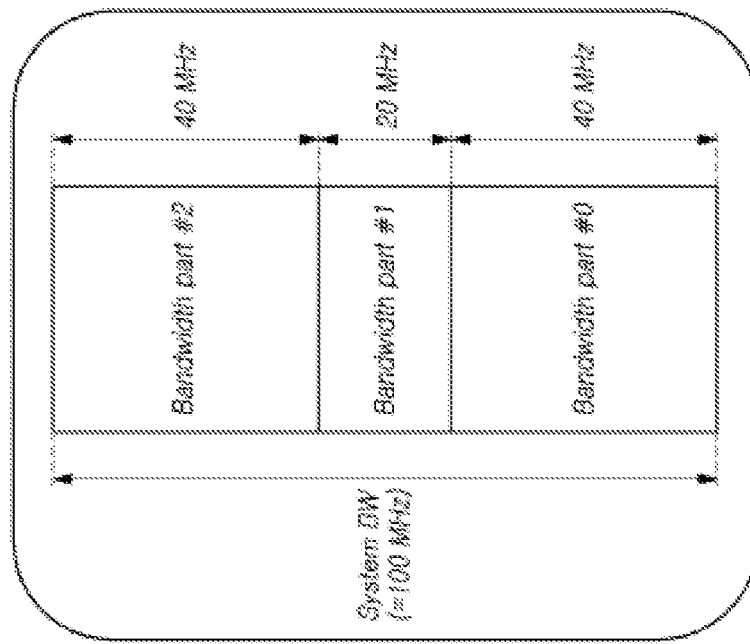
FIG. 3 illustrates a conceptual example of setting a user equipment WE)-specific bandwidth part according to an embodiment.
Figure 3:
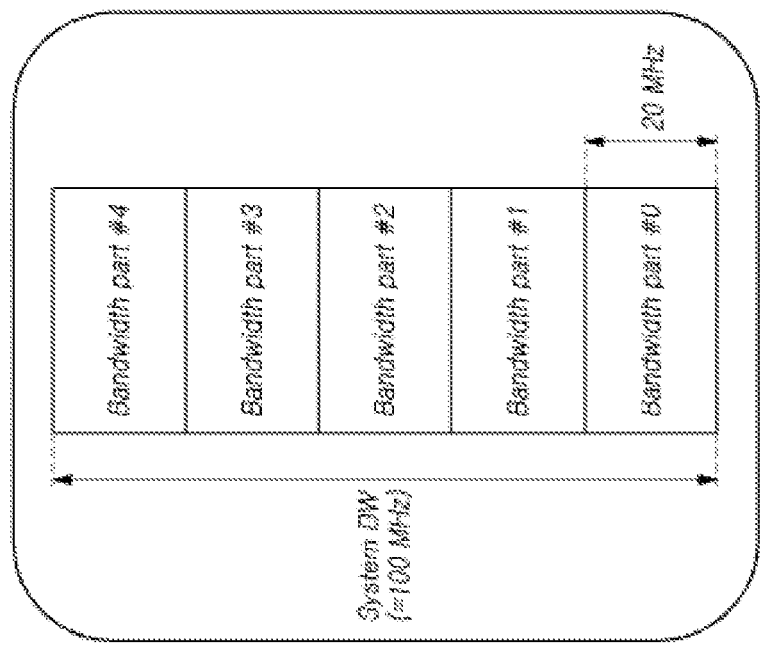

As described above, a NR CC may be configured with one or more bandwidth parts. In terms of configuring the bandwidth parts in a NR CC, the corresponding bandwidth parts may be based on a UE-specific or cell-specific configuration, in other words, the bandwidth parts may be configured differently according to the terminals as shown in FIG. 3, or the bandwidth parts may be configured equally for all the terminals with respect to a NR CC. However, FIG. 3 merely shows an example, and the specific bandwidth of the NR CC and the bandwidth for each bandwidth part are not to be construed as limiting the present disclosure.

When the bandwidth parts are configured for a certain NR CC, UL/DL bandwidth parts for communication between the terminal and the BS may be configured by activation of DI, bandwidth parts for PDSCH/PUSCH transmission and reception and activation of UL bandwidth parts for PUCCH/PUSCH transmission and reception between the BS and the terminal among the configured bandwidth parts.

In this embodiment, a frequency granularity defining method and an RB indexing method will be proposed for configuring bandwidth parts in a certain NR CC. The embodiments set forth herein may even be applied to a terminal, a BS, and a core network entity (or mobility management entity (MME) which employs all mobile communication technologies). For example, the embodiments may be applied to a next-generation mobile communication (5G mobile communication or New-RAT) terminal, a.

BS and a core network entity (access and mobility function (AMF)) as well as a mobile communication terminal employing the LTE technology. For convenience of description, the BS may refer to an eNB of LTE/E-UTRAN, or the BS may refer to a gNB and a. BS (i.e., a central unit (CU), a distributed unit (DU), or the CU and the DU may be provided as a logical entity) in the 5G radio network where the CU and the DU are separated.

Further, the numerology described in this specification refers to a numerical characteristic and a numerical value about data transmission/reception, and the numerology may be determined by a value of subcarrier spacing (hereinafter, referred to as 'SCS'). Therefore, the numerology being different may indicate that the SCS of determining the numerology is different.

In addition, a slot length in this specification may be represented by the number of OFDM symbols forming a slot or by a time occupied by the slot. For example, when the numerology based on the SCS of 15 kHz, is used, the length of one slot may be represented by 14 OFDM symbols or by 1 ms.

Below, a method of transmitting and receiving data based on RB indexing for a CC will be described in more detail through various embodiments.

The embodiments set forth herein may be applied individually or in a combination thereof.

Embodiment #1. Frequency Location Indication for Bandwidth Cart Configuration As a method of indicating a frequency location according to bandwidth parts to configure the bandwidth pails in a NR CC, a method of indicating a frequency gap (or a frequency offset) from a reference frequency point may be proposed according to this embodiment.

Specifically, as a method of defining a reference frequency point in a NR CC, the reference frequency point may be defined based on a centre frequency of the corresponding NR CC. As another method of defining a reference frequency point in a certain NR CC, the reference frequency point may be defined based on one of an upper edge and a lower edge of a bandwidth for transmitting an SS block.

Alternatively, cell-specific or UE-group common reference bandwidth parts (or default bandwidth parts) may be defined for a NR CC and a reference frequency point may be defined as the centre frequency or the upper or lower edge of the reference bandwidth parts.

In this case, the corresponding cell-specific or the UE-group common reference bandwidth parts may be defined by the minimum UE bandwidth defined in the NR including the SS block, or the corresponding cell-specific or the UE-group common reference bandwidth parts may be defined as the bandwidth parts configured for transmitting remaining minimum system information (RMSI).

Information about a reference frequency point and a frequency gap for setting certain bandwidth parts may include information about a frequency gap between the corresponding reference frequency point and the centre frequency of the bandwidth part. For example, among the preceding embodiments for defining the reference frequency point, the corresponding reference frequency point may be defined as the centre frequency of the NR CC. In this case, information for configuring a certain bandwidth part may include information about a frequency gap between the centre frequency of the corresponding NR CC and the centre frequency of the configured bandwidth part. Alternatively, the corresponding reference frequency point may be defined as the centre frequency of the cell-specific or UE-group common reference bandwidth part. In this case, information for configuring a bandwidth part may include information about a frequency gap between the centre frequency of the cell-specific or UE-group common reference bandwidth part and the centre frequency of the configured bandwidth part.

Alternatively, the foregoing information about a frequency gap may include information about a frequency gap between the upper or lower edge of the SS block and the upper or lower edge of the corresponding bandwidth part Specifically, when a bandwidth part in a frequency band which is higher than that of an SS block in a NR CC is defined, the corresponding reference frequency point for setting the frequency gap is defined as the upper edge of the SS block, and the corresponding information for configuring the bandwidth parts may be defined to include information about a frequency gap between the upper edge of the corresponding SS block and the lower edge of the bandwidth part to indicate a frequency location. On the other hand, when a bandwidth part in a frequency band Which is lower than that of an SS block in a NR CC is defined, the corresponding reference frequency point for setting the frequency gap is defined as the lower edge of the SS block, and the corresponding information far configuring the bandwidth parts may be defined to include information about a frequency gap between the lower edge of the corresponding SS block and the upper edge of the bandwidth part to indicate a frequency location.

Alternatively, the foregoing information about a frequency gap may include information about a frequency gap between the upper or lower edge of the foregoing cell-specific or UE-group common reference bandwidth part and the lower or upper edge of the corresponding bandwidth part. Specifically, when a bandwidth part in a frequency band which is higher than a reference bandwidth part in a NR CC is defined, the corresponding reference frequency point for setting the frequency gap is defined as the upper edge of the reference bandwidth part, and the corresponding information for configuring the bandwidth parts may be defined to include information about a frequency gap between the upper edge of the corresponding reference bandwidth part and the lower edge of the bandwidth part to indicate a frequency location. On the other hand, when a bandwidth part in a frequency band which is lower than a reference bandwidth part in a NR CC is defined, the corresponding reference frequency point for setting the frequency gap is defined as the lower edge of the reference bandwidth part, and the corresponding information for configuring the bandwidth parts may be defined to include information about a frequency gap between the lower edge of the corresponding reference bandwidth part and the upper edge of the bandwidth part to indicate a frequency location.

Figure 4:
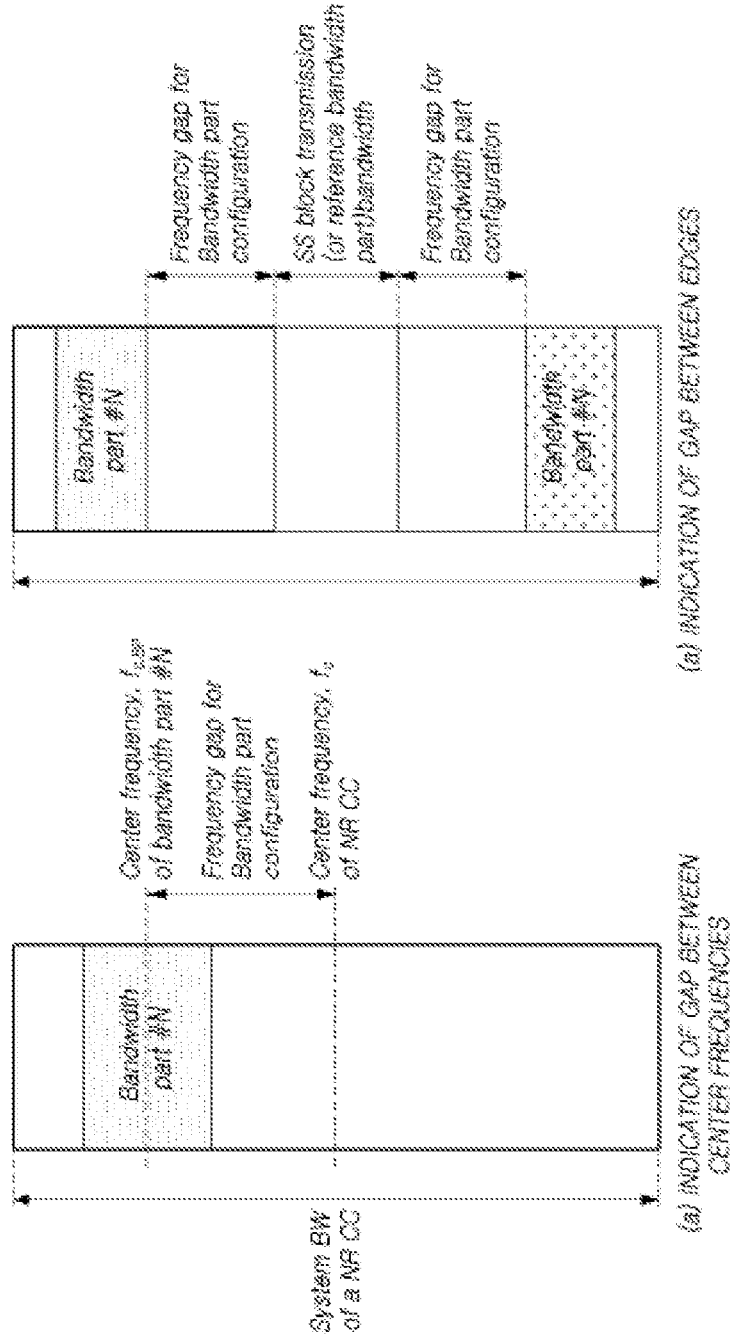
FIG. 4 illustrates a method of indicating a frequency gap according to an embodiment.

In the following FIG. 4 shows the method of indicating the frequency gap between the centre frequencies and the method of indicating the gap between the edges as described above to indicate the frequency location of each bandwidth part.

Figure 5:
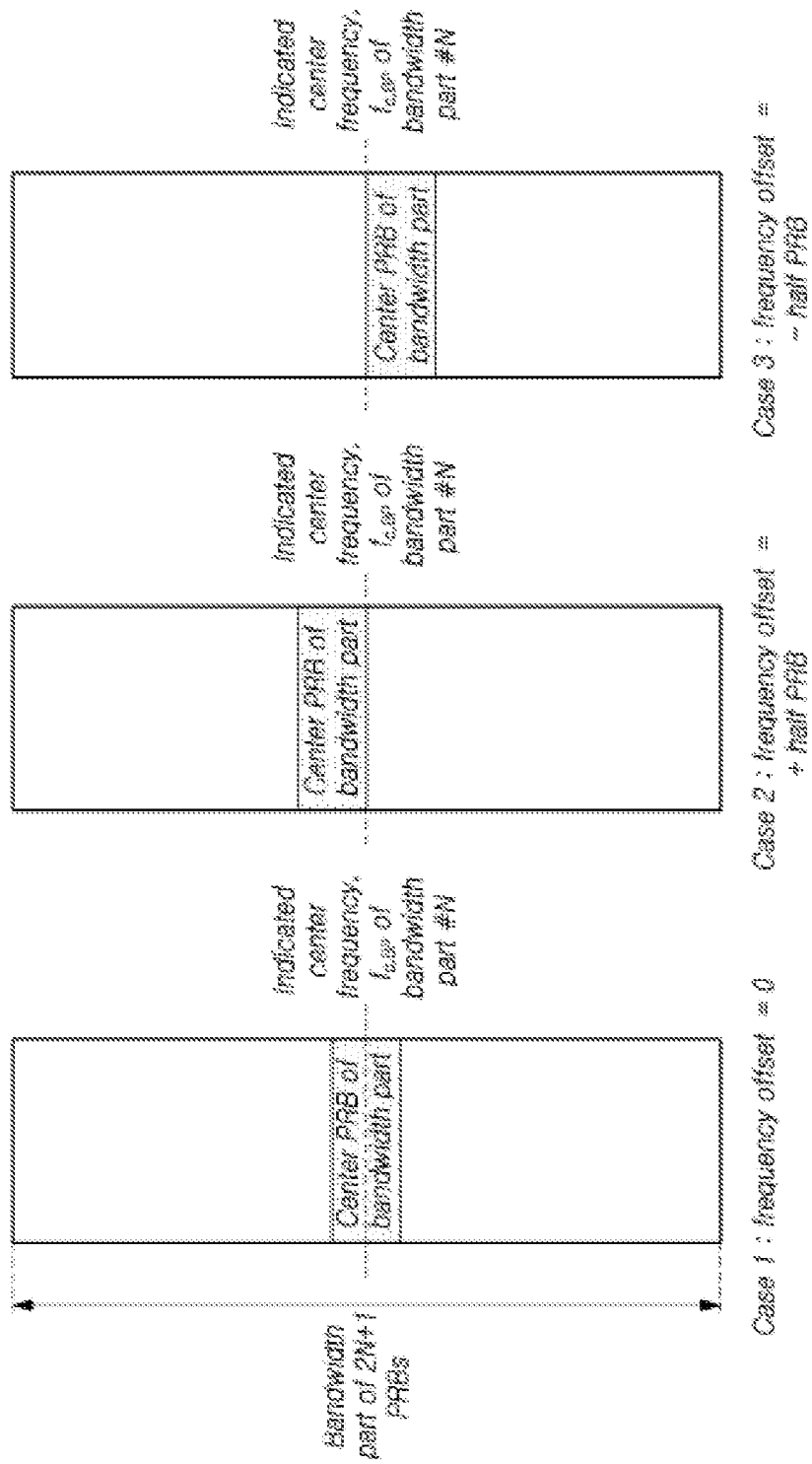
FIG. 5 illustrates a method of additionally defining an frequency offset according to an embodiment.

When the gap between the centre frequencies is indicated as described above to indicate the frequency gap, it may be defined to indicate additional frequency offset information from the centre frequency in accordance with the bandwidths of the corresponding bandwidth part in order to accurately set the frequency location. For example, when a bandwidth part is configured with odd numbered PRBs, the centre frequency of the bandwidth part set by the frequency gap indication may be not exactly located at the center of the bandwidth part as shown in FIG. 5. In other words, when a bandwidth part is configured with 2N+1 PRBs, a PRB boundary may be aligned with respect to the corresponding centre frequency or may be misaligned (i.e., in a case that the centre frequency penetrates the centre PRB of the bandwidth part) as shown in FIG. 5. In the case of alignment, the bandwidth part may include an upper band configured with N+1 PRBs and a lower band configured with N PRBs or may include an upper band configured with N PRBs and a lower band configured with N+1 PRBs with respect to the corresponding centre frequency. Therefore, information about an additional frequency offset corresponding to {+half PRB, 0, −half PRB} may be defined to set and transmitted with respect to the centre frequency of the bandwidth part configured by the frequency gap indication. However, the additional frequency offset may be analyzed based on a PRB grid according to setting values of the numerologies for the bandwidth parts and may be applied even when the bandwidth part is configured with even-numbered PRBs as well as the odd-numbered PRBs.

In the case of additionally using the foregoing bandwidth edge for the frequency gap indication, it may be defined that the frequency gap is indicated with information about whether the configured bandwidth part is set in the reference SS block or set in an upper frequency band or a lower frequency band with respect to the reference bandwidth part. Thus, as shown in FIG. 4, it may be defined that the frequency gap is indicated between the upper edge of the SS block (or the reference bandwidth part) and the lower edge of the configured bandwidth part when the bandwidth part is configured in the upper frequency band, and the frequency gap is indicated between the lower edge of the SS block (or the reference bandwidth part) and the upper edge of the configured bandwidth part when the bandwidth part is configured in the lower frequency band.

Alternatively, as described in the foregoing embodiment with reference to FIG. 4, the frequency gap indication may be achieved with respect to a fixed frequency point without changing a combination between the edge of the SS block (or the reference bandwidth part) used as a reference frequency point the determining the frequency gap and the edge of the configured bandwidth part in accordance with whether a certain bandwidth part is configured in a frequency band higher or lower than the SS block or the reference bandwidth part. In other words, the frequency gap indication may be seated with respect to the upper edge of the SS block (or the reference bandwidth part) and the upper edge of the configured bandwidth part, or may be seated with respect to the lower edge of the SS block (or the reference bandwidth part) and the lower edge of the configured bandwidth part.

Embodiment #2. Frequency Granularity for Bandwidth Part Configuration

To configure a bandwidth part in a NR CC, bandwidth configuration information is needed in addition to the frequency location configuration information of the bandwidth part according to the embodiment #1. In particular, there is a need for defining a frequency unit, i.e., a frequency granularity for the foregoing frequency gap indication and bandwidth configuration of the bandwidth part.

Specifically, units of PRB grid may be given based on an SCS value set for a bandwidth part as the frequency unit for the foregoing frequency gap indication and bandwidth configuration of the bandwidth part. That is, the foregoing frequency gap indication and bandwidth configuration of the bandwidth part may be performed in units of PRB size corresponding to the SCS configuration of the bandwidth part. In other words, when the SCS of 15 kHz is set with regard to a bandwidth part configured for a terminal, the foregoing frequency gap indication and bandwidth configuration of the bandwidth pan may be performed in units of 15 kHz SCS-based PRB, and thus the information about the frequency gap indication or information about the bandwidth configuration of the bandwidth part may be defined to indicate the number of PRBs corresponding to the frequency gap or the bandwidth of the bandwidth part.

As another method, the frequency configuration information for the foregoing frequency gap indication and bandwidth configuration of the bandwidth part may be set in units of PRB grid based on a default SCS of the NR CC (i.e., the SCS defined for transmitting a synchronization signal (SS) in the NR CC) regardless of the SCS configuration of the bandwidth part. In other words, the foregoing frequency gap indication or the bandwidth configuration of the bandwidth part is performed in units of PRB size corresponding to the default SCS configuration of the NR CC, and thus the frequency gap indication or the bandwidth configuration of the bandwidth part may be defined to be indicated with information about the number of PRBs for configuring the same.

As still another method of defining the frequency granularity, it may be defined that the frequency gap indication is set in units of PRB grid based on the default SCS of the NR CC, and the bandwidth of the bandwidth part is configured in units of PRB grid based on the SCS configuration of the corresponding bandwidth part. In this case, the frequency gap indication and the bandwidth configuration of the bandwidth part are respectively performed in units of PRB grid based on the default SCS and units of PRB grid based on the SCS configured for the bandwidth part, and are each indicated in the form of the corresponding numbers of PRBs.

As still another method of defining the frequency granularity, it may be defined that the frequency configuration information for the foregoing frequency gap indication and bandwidth configuration of the bandwidth part is set based on absolute frequency hand information. In other words, when a frequency gap and a frequency band for configuring a bandwidth of a bandwidth part are respectively X MHz and V MHz, it may be defined that the values of X and Y are directly subjected to signaling. In this case, it may be limited that candidate values to be set as the values of X and Y are restricted, and one of the candidate values is selected. For example, values of {N1, N2, N3, and N4} are defined as candidate values for X and Y, and one of the candidate values is set and defined for the signaling. However, candidate values for the frequency gap indication and candidate values for indicating the bandwidth of the bandwidth part may be different from each other. Further, embodiments of the present disclosure may be applied regardless of a specific candidate value.

As still another method of defining the frequency granularity, the minimum frequency bandwidth is defined as units of setting a frequency for the frequency gap indication and the bandwidth configuration of the bandwidth part, and the frequency gapindication and the bandwidth the bandwidth part are set in units of the minimum frequency bandwidth. For example, the minimum frequency bandwidth may be defined as an SS block corresponding to a frequency range configured with the NR CC or a transmission bandwidth of a synchronization signal. Alternatively, the minimum frequency bandwidth may be defined as a value corresponding to a transceiving bandwidth of an NR terminal having the lowest capability defined in the NR. When the minimum frequency bandwidth is defined like this, each of the frequency gap configuration and the bandwidth configuration of the bandwidth part may be materialized in a multiple form of the minimum frequency bandwidth.

Embodiment #3. PRB Indexing

As described above, in the NR, for efficient multiplexing between terminals having different transceiving bandwidths within one NR CC, it has been designed that one or more bandwidth parts are configured with regard to a NR CC so that the UL/DL transmission and reception may be enabled based on the corresponding bandwidth parts. In particular, the bandwidth parts may be differently configured according to the terminals within one NR. CC. Further, it has been taken into account that BS/terminal operations are defined to support a plurality of bandwidth parts within one NR CC through a carrier aggregation (CA) form.

Therefore, there is a need for defining a PRB indexing method in which the configuration of the bandwidth parts differ according to the terminals and different operation scenarios for configuring/aggregating the bandwidth parts are taken into account. The PRE indexing is not only needed for indicating a frequency resource allocation for transceiving a data channel of each terminal but also used for sequence generation of a certain reference signal (RS) (e.g., DM RS, CSI-RS, etc.), and thus a PRB indexing method is required in this regard.

To this end, a unified PRB indexing method is proposed for PRE indexing with regard to a certain NR CC regardless of the configuration of bandwidth parts according to the terminals. Here, the unified PRB indexing may also be called common RE indexing or common resource block indexing, and the terms are not to be construed as limiting embodiments of the present disclosure.

The single PRE indexing may be used regardless of whether a NR CC is configured based on a single numerology or whether multiple numerologies are subjected to multiplexing, and also regardless of how the bandwidth parts are configured according to the terminals.

Specifically, it may be defined that a NR CC is subjected to a PRB indexing mile in increasing order from the lowest frequency, regardless of the configuration of the numerologies and the configuration of the bandwidth parts according to the terminals within the NR CC. For example, as shown in FIG. 6, when a NR CC is configured with N PRBs based on 15 kHz SCS and M PRBs based on 30 kHz SCS, which are multiplexed in the form of FDM, the PRB indexing is defined in the NR CC in sequence from the lowest frequency band, i.e., from PRB #0 to PRB #(N+M−1).

Alternatively, the above unified PRB indexing may be defined to be sequentially performed from the reference frequency point described in the Embodiment #1.

Like this, when the unified PRB indexing is applied in units of the NR CC, a method of deriving the PRB indexing for the bandwidth parts has to be defined in the terminal at the configuration of the bandwidth parts. To this end, a method is proposed for indicating a starting PRB index of the bandwidth part, i.e., an index of the lowest PRB of the bandwidth part to the terminal when a certain bandwidth pail is configured or when a certain bandwidth part is activated. In other words, it may be defined that the starting PRB index (e.g., the starting PRB offset value) of a bandwidth part is indicated to a terminal through UE-specific or cell-specific higher layer signaling when the bandwidth part is set for the certain terminal. Alternatively, it may be defined that the starting PRB index value of a bandwidth part to be activated through activation signaling (e.g., MAC CE signaling, L1 control signaling, etc.) is included when the bandwidth part is activated for a certain terminal.

Figure 6:
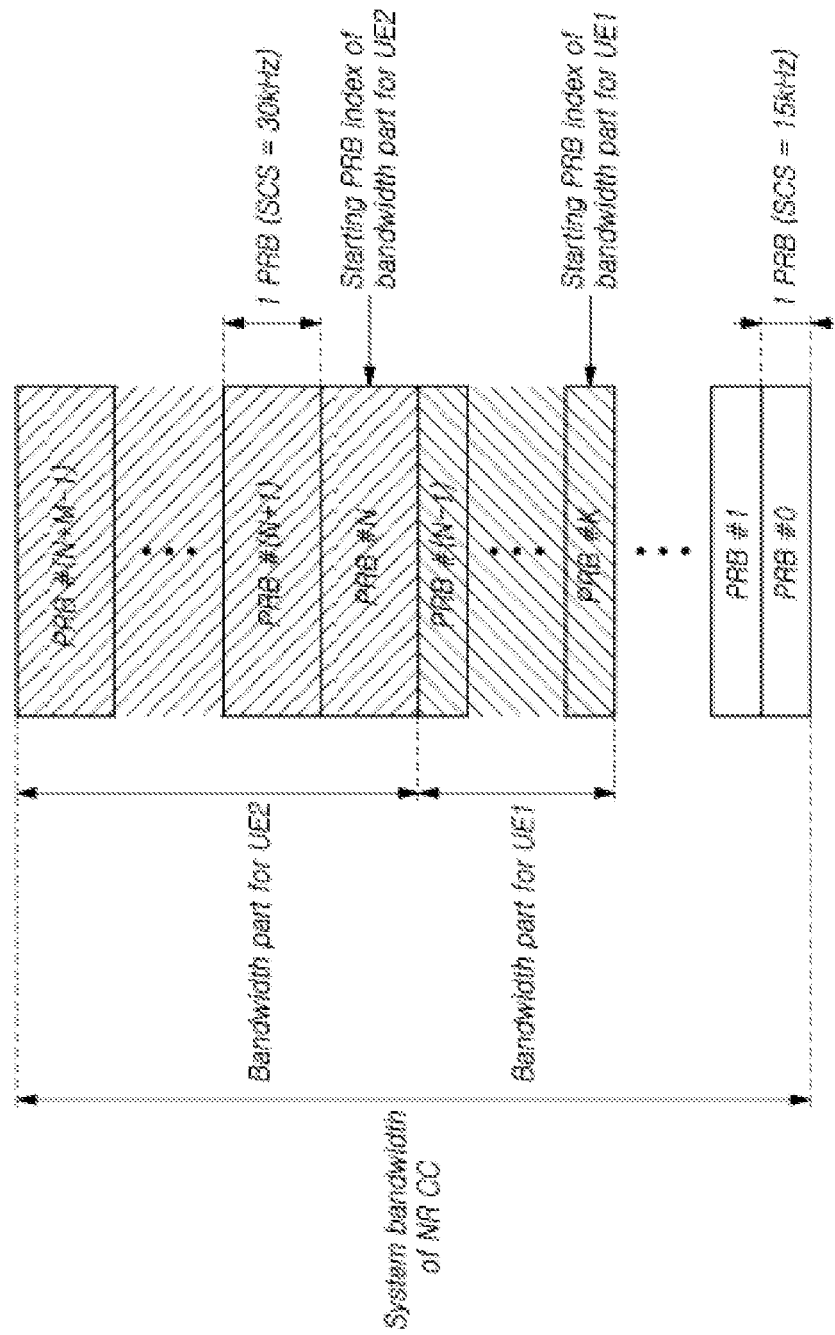
FIG. 6 illustrates a method of indicating a starting physical resource block (PRB) index for setting the bandwidth part according to an embodiment.

For example, as shown in FIG. 6, in a case where a bandwidth part for a UE 1 is configured with 15 kHz PRBs and a bandwidth part for a UE 2 is configured with 30 kHz PRBs, it may be defined that the starting PRB index is indicated corresponding to the bandwidth part when the bandwidth part is configured for each terminal in a NR BS/cell or when the bandwidth part is activated. In other words, the BS/cell may indicate the starting PRE index, i.e., a value of K for the bandwidth part to the UE1 and may indicate the starting PRB index, i.e., a value of N for the bandwidth part to the UE2.

As another PRB indexing method for a bandwidth part, it may be defined that independent PRB indexing according to the bandwidth parts is additionally defined together with the PRB indexing method applied in the bandwidth parts according to the unified PRB indexing method, and the above two types of PRB indexing are divisionally applied according to use cases.

In other words, when a bandwidth part is configured with P PRBs, it may be defined that specific PRB indexes are defined to the bandwidth part in increasing order from PRB #0 to PRB #(P−1) in a frequency domain with regard to P PRBs of the bandwidth part together with the above unified PRB indexing method, and one of the two types of PRB index is applied according to the use cases of the PRB index.

According to one embodiment, it may be defined that the unified PRB index is used for the sequence generation of the RS, and a local PRB index is applied when a PRB allocation information range is configured and analyzed in a DL assignment or UL grant DCI including scheduling control information about the PDSCH or PUSCH. In this case, a method of indexing a local PRB refers to a method of indexing a PRB corresponding to a terminal-specific bandwidth part, and it may also be called UE-specific PRB indexing. The terms are not to be construed as limiting embodiments of the present disclosure.

According to one embodiment, it may be defined that the PRB indexing is independently performed for each of the bandwidth parts. That is, as described above, when a bandwidth part is configured with P PRBs, the PRB indexes specific to the bandwidth part are defined in increasing order from PRB #0 to PRB #(P−1) in the frequency domain with regard to certain P PRBs of the bandwidth part together with the unified PRB indexing method. However, when the PRB index-based sequence generation is applied fix generating and transceiving all the LL/DL RSs, which may be defined in the NR, such as a CSI-RS, a DM RS, a PT-RS or a IRS, a SRS, etc., or when an RS structure (e.g., in which an RS is generated to have a certain sequence length, and a mapping portion of the whole sequence is varied depending on a PRB index or a PRB location) to be expected to be transmitted and received between the terminal and the BS is determined based on the PRB index, it may be defined that the terminal or the BS indicates an offset value of the PRB for transceiving the RS with respect to the PRB index of the bandwidth part, i.e., a value corresponding to a misalignment gap between a sequence boundary of each RS and the PRB #0 of the bandwidth part.

Figure 7:
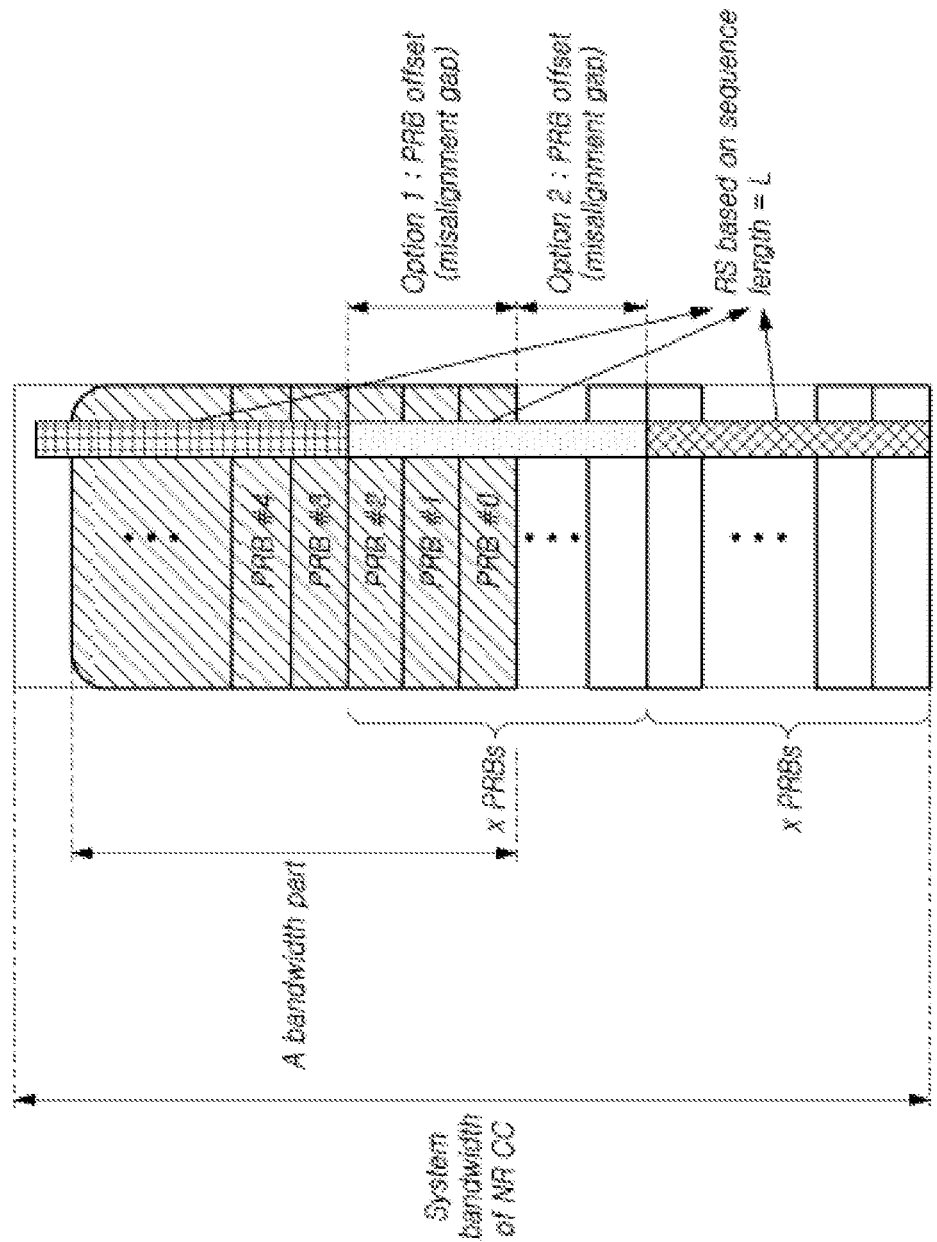
FIG. 7 illustrates a method of indicating a PRB offset for transmitting and receiving a reference signal (RS) according to an embodiment.

In other words, in a case where an RS is defined based on a length which is L and mapped in units of × PRBs in the frequency domain as shown below in FIG. 7, information about the PRB offset value with regard to the RS in the bandwidth part (or about the misalignment gap) is indicated through UE-specific or cell-specific higher layer signaling, MAC CE signaling, or L1 control signaling in a BS/network when a certain bandwidth part is configured and activated or When information about transmission and reception of the RS signal is transmitted.

In addition, the foregoing method of indexing the PRB according to the bandwidth parts or indication method related to the transmission and reception of the RS may be equally applied to a terminal in Which a CA-based operation is applied to a plurality of bandwidth parts in a certain NR CC.

Figure 8:
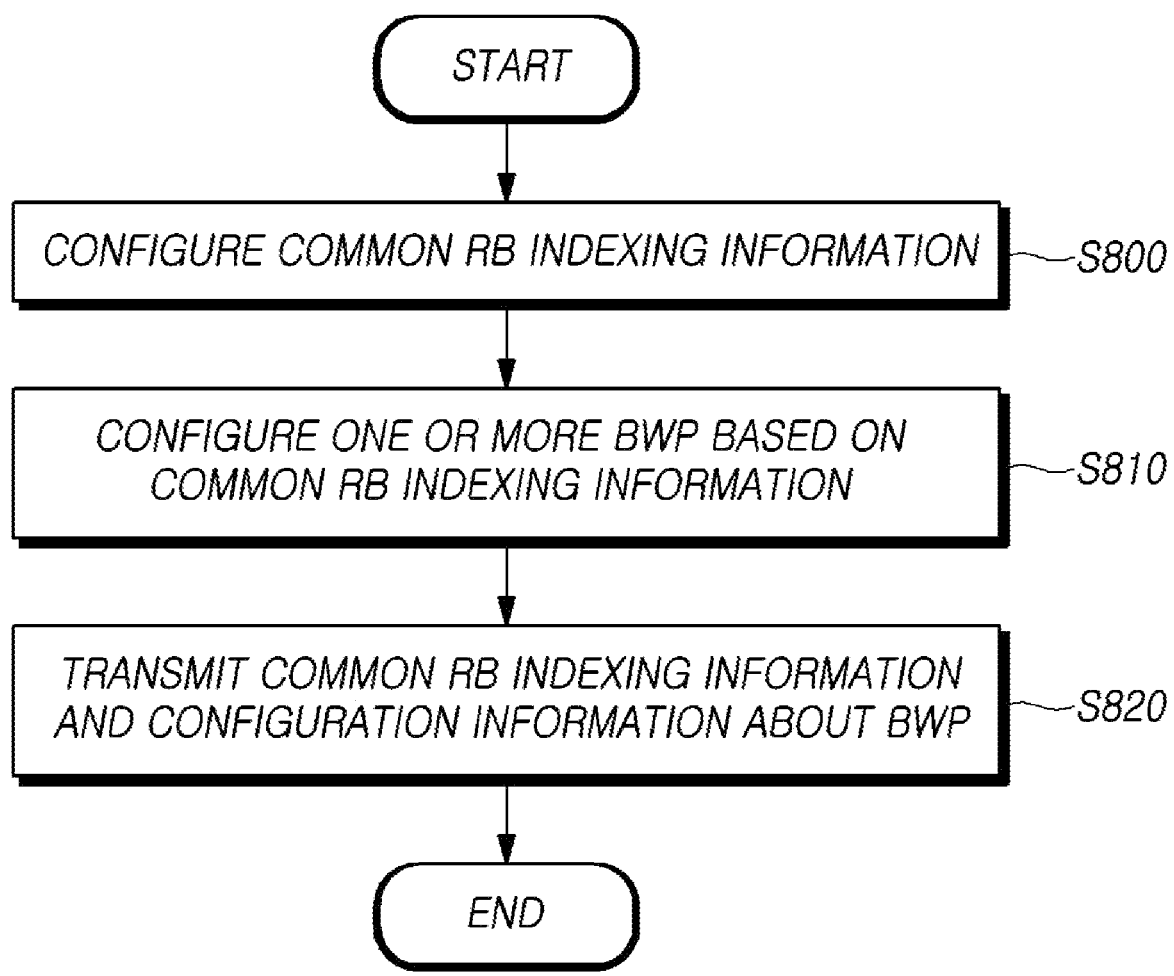
FIG. 8 illustrates a method of configuring resource block (RB) indexing information about component carriers (CCs) in a base station (BS) according to an embodiment.

FIG. 8 illustrates a method of configuring RB indexing information about CCs in a BS according to an embodiment.

Referring to FIG. 8, the BS may configure common RB indexing information about the CC (S800). Here, the CC may refer to a narrowband (NB) CC or a wideband (WB) CC and may refer to one or more CCs forming CA. All the terminals using the same CCs share the same common RB indexing information.

As described above in Embodiment #3, such common RB indexing information may be applied regardless of whether the CC is based on a single numerology or multiple numerologies. In other words, the physical RBs indicated based on the common RB indexing information may be different in frequency bandwidth from one another.

The common RB indexing information may be employed in scheduling a group-common PDSCH, generating a sequence of the RS, or configuring the bandwidth part.

Further, the BS may configure one or more bandwidth parts (BWPs) based on the common RB indexing information configured in operation S800 (S810). In this case, configuration information about each of the bandwidth parts may include a starting RB index, i.e., a start point of the bandwidth part based on the common RB indexing information. Such a starting PRB index may be represented in units of RB index based on the common RB indexing.

Further, the configuration information about each of the bandwidth parts may additionally include information about the starting RB index based on the common RB indexing information and information about the size of the bandwidth part. The configuration information about each of the bandwidth parts may include a PRB index for indicating the end of the bandwidth part instead of the size of the bandwidth part. The PRB index may also be configured based on the common RB indexing information.

Then, the BS may transmit the common RB indexing information and the configuration information about the bandwidth parts respectively configured in operations S800 and S810 to the terminal (S820). In this case, for example, the BS may transmit the common RB indexing information and the configuration information about the bandwidth parts to the terminal through the higher layer signaling (e.g., RRC signaling).

The terminal receives the common RB indexing information and the configuration information about the bandwidth parts and uses one bandwidth part activated among one or more (up to four) bandwidth parts configured for the terminal in transmitting and receiving a UL/DL radio signal and a radio channel. In this case, the terminal may receive information about what bandwidth part is activated through a DCI. In this case, the BS may additionally configure DE-specific PRB indexing information based on each of the bandwidth parts configured in operation S810. For instance, the PRE indexing information may be additionally configured according to the size of the bandwidth part from zero with respect to the bandwidth part i configured for a terminal based on the common RB indexing information. In other words, UE-specific PRB indexing information may be additionally configured from zero (i.e., a bandwidth part size−1) with respect to the bandwidth part i according to information about the size of the bandwidth pan and the starting RB index information indicated based on the common RE indexing information to configure the bandwidth parts.

Further, each terminal may receive a radio Channel scheduled based on the UE-specific PRB indexing, information corresponding to each bandwidth part used by itself from the BS. For example, the UE-specific PDSCH may be scheduled based on the UE-specific PRB indexing information, and index information about the scheduled UE-specific PDSCH may be indicated through the DCI.

Figure 9:
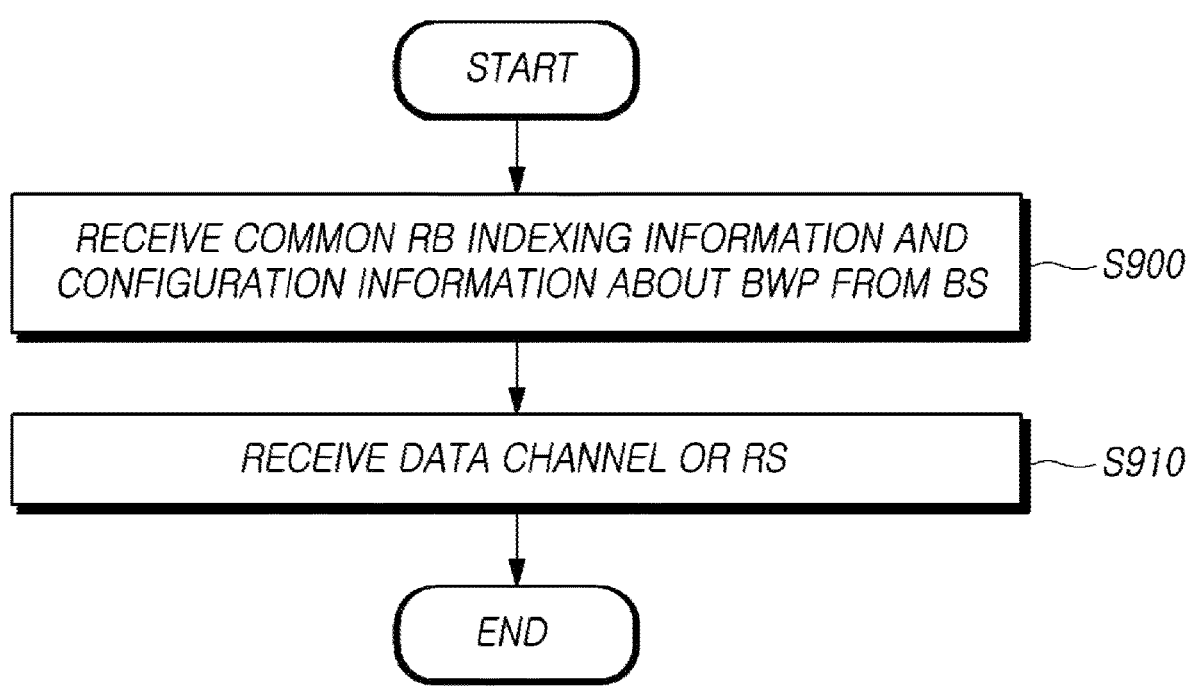
FIG. 9 illustrates a method of receiving a radio channel or a radio signal based on the RB indexing about the CCs in a terminal according to an embodiment.

FIG. 9 illustrates a method of receiving a radio channel or a radio signal based on the RB indexing about the CCs in a terminal according to an embodiment.

Referring to FIG. 9, the terminal may receive common RE indexing information about the CC and configuration information about a bandwidth part from a BS (S900).

In this case, as described above in FIG. 8, the CC may refer to a NB CC or a WB CC and may refer to one or more CCs forming CA. Further, as described above in Embodiment #3, the common RB indexing information may be applied regardless of whether the CC is based on a single numerology or multiple numerologies.

The common RB indexing information may be, for example, employed in scheduling a group-common PDSCH among radio channels, generating a sequence of the RS in a radio signal, or configuring the bandwidth part.

In this case, configuration information about each of the bandwidth parts may include a starting RB index, i.e., a start point of the bandwidth part based on the common RB indexing information. Such a stilling RB index may be represented in units of PRB index based on the common. RB indexing.

Further, the configuration information about each of the bandwidth parts may additionally include information about the starting RB index based on the common RB indexing information and information about the size of the bandwidth part. The configuration information about each of the bandwidth parts may include a PRB index for indicating the end of the bandwidth part instead of the size of the bandwidth part. The PRB index may also be configured based on the common RB indexing information.

Then, the terminal may receive a radio channel or a radio signal from the BS based on the common RB indexing information and the configuration information about the bandwidth parts received in operation S900 (S910).

The terminal receives the common RB indexing information and the configuration information about the bandwidth pails and uses one bandwidth part activated at every specific time interval among one or more (up to four) bandwidth pans configured for the terminal in transmitting and receiving UL/DL, radio signal and a radio channel (e.g., PDSCH).

In this case, the terminal may additionally receive the UE-specific PRB indexing information based on each of the bandwidth pans. For instance, the PRB indexing information may be additionally configured according to the size of the bandwidth part from zero with respect to the bandwidth part i configured for a terminal based on the common RB indexing information. In other words, UE-specific PRB indexing information may be additionally configured from zero (i.e., a bandwidth part size−1) with respect to the bandwidth part i according to information about the size of the bandwidth part and the starting RB index information indicated based on the common RB indexing information to configure the bandwidth parts.

Further, the BS may transmit a radio channel scheduled based on the UE-specific PRB indexing information corresponding to each bandwidth pad used by itself. For example, the UE-specific PDSCH may be scheduled based on the UE-specific PRB indexing information, and index information about the scheduled UE-specific PDSCH may be indicated through the DCI.

Figure 10:
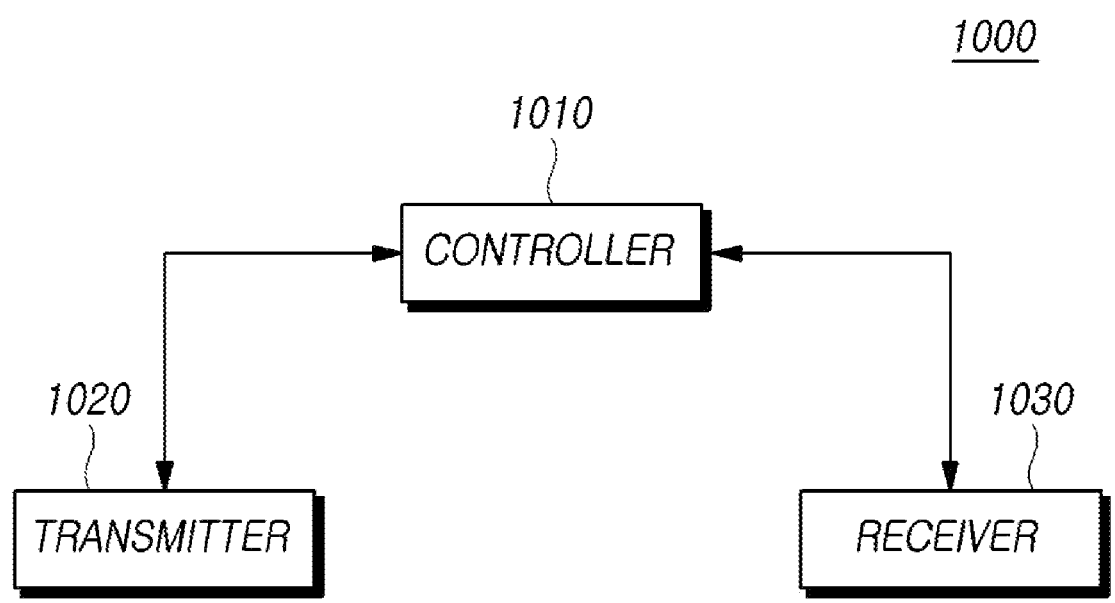
FIG. 10 illustrates a BS according to embodiments.

FIG. 10 illustrates a BS according to embodiments.

Referring to FIG. 10, a BS 1000 includes a controller 1010, a transmitter 1020, and a receiver 1030.

The controller 1010 may configure common RB indexing information about the CC and one or more bandwidth parts based on the common RB indexing information Here, the CC may refer to a NB CC or a WB CC and may refer to one or more CCs forming CA. All the terminals using the same CCs share the same common RB indexing information.

As described above in Embodiment #3, such common RB indexing information may be applied regardless of Whether the CC is based on a single numerology or multiple numerologies. In other words, the physical RBs indicated based on the common RB indexing information may be different from one another in frequency bandwidth.

The common RB indexing information may be employed in scheduling a group-common PDSCH, generating a sequence of the RS, or configuring the bandwidth part.

In this case, configuration information about each of the bandwidth parts may include a starting RB index, i.e., 0 start point of the bandwidth part based on the common RB indexing information.

Further, the configuration information about each of the bandwidth parts may additionally include information about the starting RB index based on the common RB indexing information and information about the size of the bandwidth part. The configuration information about each of the bandwidth parts may include a PRB index for indicating the end of the bandwidth part instead of the size of the bandwidth part. The PRB index may also be configured based on the foregoing common RB indexing information.

In addition, the BS 1000 may configure UE-specific PRB indexing information based on each of the bandwidth parts. For instance, the PRB indexing information may be additionally configured according to the size of the bandwidth part from zero with respect to the bandwidth part i configured for a terminal based on the common RB indexing information. In other words, UE-specific PRB indexing information may be additionally configured from zero (i.e., a bandwidth part size−1) with respect to the bandwidth part i according to information about the size of the bandwidth part and the starting RB index information indicated based on the common RB indexing information to configure the bandwidth parts.

The transmitter 1020 and the receiver 1030 are used in transmitting and receiving a signal, a message, or data to and from the terminal 1100 according to the present disclosure.

Specifically, the transmitter 1020 may transmit the common RB indexing information and the configuration information about the bandwidth parts to the terminal.

In this case, for example, the BS 1000 may transmit the common RB indexing information and the configuration information about the bandwidth pans to the terminal 1100 through the higher layer signaling (e.g., RRC signaling).

The terminal 1100 receives the common RB indexing information and the configuration information about the bandwidth parts and uses one bandwidth part activated at every specific time interval among one or more (up to four) bandwidth parts configured for the terminal in transmitting and receiving a UL/DL radio signal and a radio channel.

Further, the transmitter 1020 may additionally transmit the UE-specific PRB indexing information based on the bandwidth parts to the terminal. Then, the terminal receives the UE-specific PRB indexing information and is capable of receiving a radio Channel scheduled based on the UE-specific PRB indexing information corresponding to each bandwidth part used by itself from the BS 1000. For example, the UE-specific PDSCH may be scheduled based on the UE-specific PRB indexing information, and index information about the scheduled UE-specific PDSCH may be indicated through the DCI.

Figure 11:
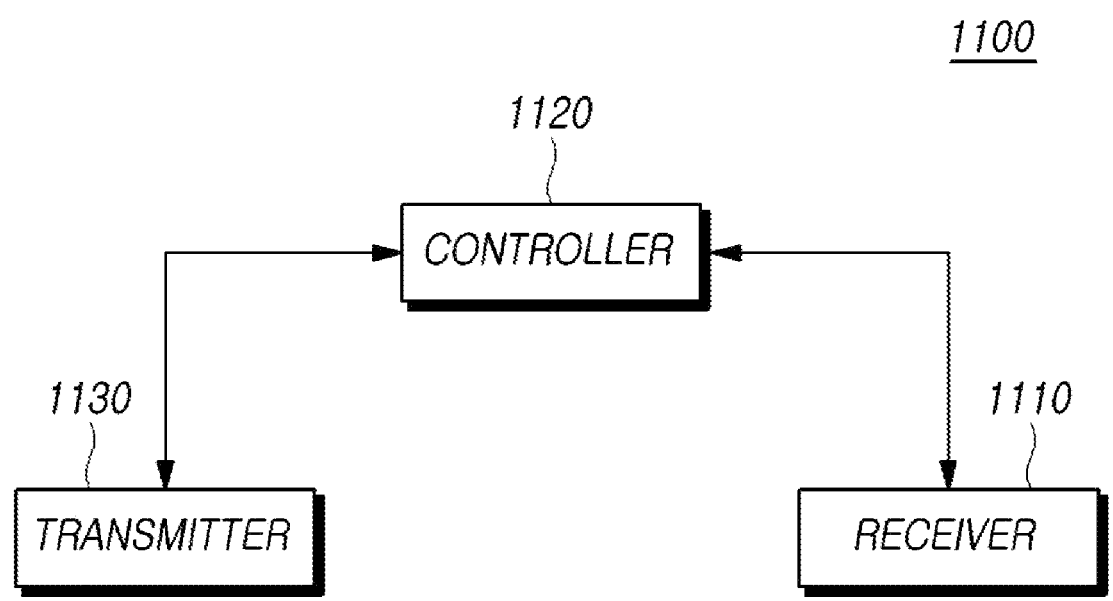
FIG. 11 illustrates a terminal according to embodiments.

FIG. 11 illustrates a terminal according to embodiments.

Referring to FIG. 11, a terminal 1100 includes a receiver 1110, a controller 1120, and a transmitter 1130.

The receiver 1110 receives DL control information, data, and a message from the BS 1000 through a corresponding channel. Specifically, the receiver 1110 may receive common RB indexing information about the CC and configuration information about a bandwidth part from the BS 1000 and may receive a radio channel or a radio signal based on the common RB indexing information and the configuration information about the bandwidth part.

In this case, as described above, the CC may refer to a NB CC or a WB CC and may refer to one or more CCs forming CA. Further, as described above in Embodiment #3, the common RB indexing information may be applied regardless of whether the CC is based on a single numerology or multiple numerologies.

In this case, configuration information about each of the bandwidth parts may include a starting RB index, i.e., a start point of the bandwidth peat based on the common RB indexing information.

The common RB indexing information may be, for example, employed in scheduling a group-common PDSCH among radio channels, generating a sequence of the RS in a radio signal, or configuring the bandwidth pan.

Further, the configuration information about each of the bandwidth parts may additionally include information about the starting RB index based on the common RB indexing information and information about the size of the bandwidth part. The configuration information about each of the bandwidth parts may include a PRB index for indicating the end of the bandwidth part instead of the size of the bandwidth part. The PRB index may also be configured based on the foregoing common RB indexing information.

The terminal 1100 receives the common RB indexing information and the configuration information about the bandwidth pans and uses one bandwidth part activated at every specific time interval among one or more (up to four) bandwidth parts configured for the terminal in transmitting and receiving a UL/DL radio signal and a radio channel (e.g., PDSCH).

In this case, the terminal 1100 may additionally receive the UE-specific PRB indexing information based on each of the bandwidth parts. For instance, the PRB indexing information may be additionally configured according to the size of the bandwidth part from zero with respect to the bandwidth part i configured for a certain terminal based on the common RB indexing information. In other words, UE-specific PRB indexing information may be additionally configured from zero (i.e., a bandwidth part size−1) with respect to the bandwidth part i according to information about the size of the bandwidth part and the starting RB index information indicated based on the common RB indexing information to configure the bandwidth parts.

Further, the BS 1000 may transmit a radio channel scheduled scheduled based on the UE-specific PRB indexing information corresponding to each bandwidth part used by itself. For example, the UE-specific PDSCH may be scheduled based on the UE-specific PRB indexing information, and index information about the scheduled. UE-specific PDSCH may be indicated through the DCI.

The controller 1120 may control general operations when the terminal receives a radio channel or a radio signal based on PRB indexing with regard to a CC.

According to the present embodiments, there are provided a method of configuring bandwidth parts for setting frequency resources of NR CCs and a method of indexing a RB.

Standard details or standard documents described in the above embodiments are omitted for simplicity of description of the specification and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit, but are intended to illustrate the technical idea of the present disclosure, and the scope of the technical idea of the present disclosure is not to be limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or disc between two or more computers.

What is claimed is:

1. A wireless device, device comprising:
   a transmitter;
   a receiver; and
   a controller which controls the transmitter and the receiver to:
      receive information on a reference point and information on one or more bandwidth parts (BWPs),
         wherein the one or more BWPs exist in one component carrier (CC),
         wherein each of the one or more BWPs has a location that is determined based on the reference point,
         wherein the information on the one or more BWPs includes an index of a starting physical resource block (PRB) for each BWP of the one or more BWPs and a number of PRBs within each BWP of the one or more BWPs,
         wherein the index of the starting PRB for each BWP of the one or more BWPs is based on a common PRB index, which is numbered from a lowest frequency in the one CC, and
         wherein, within each BWP of the one or more BWPs, a BWP-specific PRB index is used;
      activate at least one BWP of the one or more BWPs to receive downlink data and transmit uplink data within the at least one BWP,
         wherein the downlink data is received and the uplink data is transmitted, based on the BWP-specific PRB index; and
      receive a synchronization signal (SS) block in at least one PRB,
         wherein the at least one PRB where the SS block is received is determined based on the information on the reference point.

2. The wireless device of claim 1, wherein the common PRB index is sequentially numbered from 0 in a vicinity of the reference point.

3. The wireless device of claim 1, wherein the information on the reference point and the information on the one or more BWPs are received via a radio resource control (RRC) signal.

4. The wireless device of claim 1, wherein the BWP-specific PRB index is numbered from 0 within each BWP of the one or more BWPs.

5. The wireless device of claim 1, wherein each of the at least one or more BWPs is determined based on the reference point and the index of the starting PRB for each BWP of the one or more BWPs.

6. The wireless device of claim 1, wherein the information on the reference point is used to determine a lowest PRB of the at least one PRB where the SS block is received.

7. A base station comprising:
   a transmitter;
   a receiver; and
   a controller which controls the transmitter and receiver to:
      transmit information on a reference point and information on one or more bandwidth parts (BWPs),
         wherein the one or more BWPs exist in one component carrier (CC),
         wherein each of the one or more BWPs has a location that is determined based on the reference point, wherein the information on the one or more BWPs includes an index of a starting physical resource block (PRB) for each BWP of the one or more BWPs and a number of PRBs within each BWP of the one or more BWPs, wherein the index of the starting PRB for each BWP of the one or more BWPs is based on a common PRB index, which is numbered from a lowest frequency in the one CC, and wherein, within each BWP of the one or more BWPs, a BWP-specific PRB index is used;

transmit downlink data and receive uplink data within at least one BWP of the one or more BWPs, wherein the downlink data is transmitted and the uplink data is received, based on the BWP-specific PRB index; and transmit a synchronization signal (SS) block in at least one PRB, wherein the at least one PRB where the SS block is transmitted is determined based on the information on the reference point.

8. The base station of claim 7, wherein the common PRB index is sequentially numbered from 0 in a vicinity of the reference point.

9. The base station of claim 7, wherein the information on the reference point and the information on the one or more BWPs are transmitted via a radio resource control (RRC) signal.

10. The base station of claim 7, wherein the BWP-specific PRB index is numbered from 0 within each BWP of the one or more BWPs.

11. The base station of claim 7, wherein each of the one or more BWPs is determined based on the reference point and the index of the starting PRB for each BWP of the one or more BWPs.

12. An apparatus for a wireless device, the apparatus comprising:

a controller which controls a transmitter and a receiver of the wireless device to:

receive information on a reference point and information on one or more bandwidth parts (BWPs), wherein the one or more BWPs exist in one component carrier (CC), wherein each of the one or more BWPs has a location that is determined based on the reference point, wherein the information on the one or more BWPs includes an index of a starting physical resource block (PRB) for each BWP of the one or more BWPs and a number of PRBs within each BWP of the one or more BWPs, wherein the index of the starting PRB for each BWP of the one or more BWPs is based on a common PRB index, which is numbered from a lowest frequency in the one CC, and wherein, within each BWP of the one or more BWPs, a BWP-specific PRB index is used;

activate at least one BWP of the one or more BWPs to receive downlink data and transmit uplink data within the at least one BWP, wherein the downlink data is received and the uplink data is transmitted, based on the BWP-specific PRB index; and receive a synchronization signal (SS) block in at least one PRB, wherein the at least one PRB where the SS block is received is determined based on the information on the reference point.

13. The apparatus of claim 12, wherein the common PRB index is sequentially numbered from 0 in a vicinity of the reference point.

14. The apparatus of claim 12, wherein the information on the reference point and the information on the one or more BWPs are received via a radio resource control (RRC) signal.

15. The apparatus of claim 12, wherein the BWP-specific PRB index is numbered from 0 within each BWP of the one or more BWPs.

16. The apparatus of claim 12, wherein each of the one or more BWPs is determined based on the reference point and the index of the starting PRB for each BWP of the one or more BWPs.

17. The apparatus of claim 12, wherein the information on the reference point is used to determine a lowest PRB of the at least one PRB where the SS block is received.

* * * * *